Sept. 4, 1928.  D. F. FESLER  1,682,898
LUBRICATING SYSTEM
Filed Feb. 21, 1924
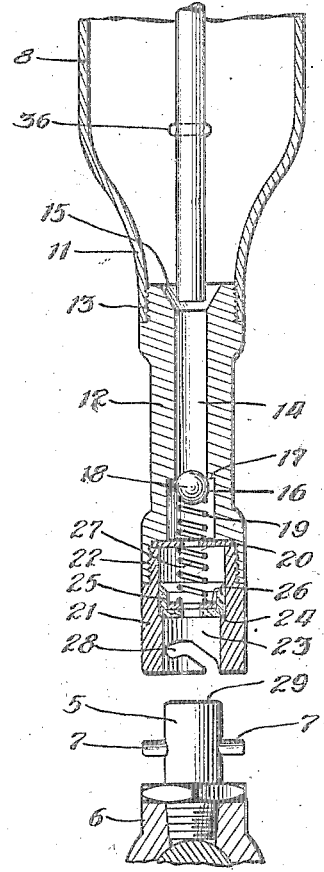
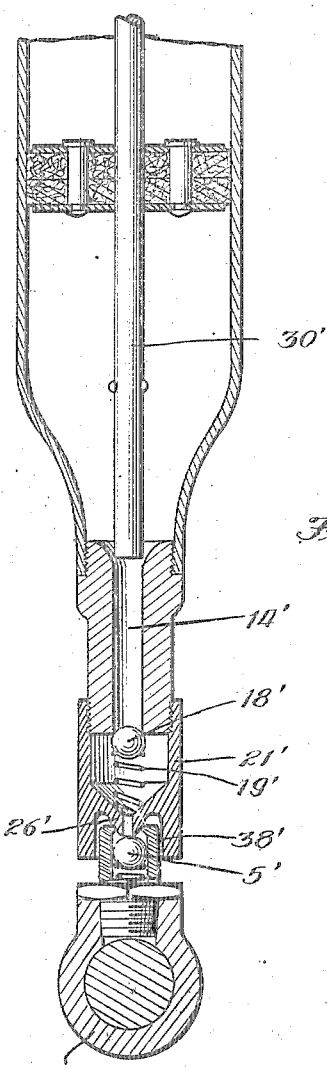
Fig. 1.
Fig. 2.
Inventor
Douglas F. Fesler
Williams Bradbury
McCabt & Rice, attys.

Patented Sept. 4, 1928.

1,682,898

UNITED STATES PATENT OFFICE.

DOUGLAS F. FESLER, OF CHICAGO, ILLINOIS, ASSIGNOR TO THE BASSICK MANUFACTURING COMPANY, OF CHICAGO, ILLINOIS, A CORPORATION OF DELAWARE.

LUBRICATING SYSTEM.

Application filed February 21, 1924. Serial No. 694,301.

My invention relates to improvements in lubricating systems, and is particularly concerned with improvements in that type of lubricating system which comprises a plurality of fittings adapted to be secured to the various bearings to be lubricated, and a compressor for supplying lubricant under pressure to the fittings, the compressor embodying means for successively making sealed connections with the fittings.

The objects of my present invention are,

First, to provide a lubricating system of the character described, comprising a novel compressor by means of which the operator can exert comparatively high pressure upon the lubricant supplied to the fittings:

Second, to provide a compressor such as described, comprising a barrel or lubricant receptacle, a cylinder communicating with the barrel, means for ejecting the lubricant from the cylinder, and other means actuated by the last named means for forcing the lubricant from the barrel into the cylinder;

Third, to provide a novel compressor forming a part of the system described above, and Fourth, to provide a lubricating system and a compressor of the character described, which are simple in construction, economical to manufacture, and easy to operate.

Other objects of my invention will appear as this description progresses, reference being had to the accompanying drawings, in which Figure 1 is a central longitudinal section through a compressor embodying my invention. This figure includes a side elevation of a fitting which may form a part of my invention, and Figure 2 is a central longitudinal section of a modified form of my invention.

Referring for the present to Figure 1 in the drawings, my improved lubricating system comprises a plurality of fittings 5 which are adapted to be secured to the various bearings 6 to be lubricated. In this embodiment of my invention the fitting is illustrated as comprising a pin, the ends 7 of which project from the body of the fitting for a purpose which will later be referred to. The compressor comprises the barrel 8 having the removable cap 9 at one end thereof, this cap being secured to the open end of the barrel by means of the screw-threaded connection 10, or in any other suitable manner. The other end of the barrel is reduced in diameter as shown at 11, and has secured thereto the cylinder 12, this cylinder being detachably secured to the reduced portion 11 of the barrel by means of the screw threaded connection 13, or in any other suitable manner. The bore 14 of the cylinder 12 is counterbored at 15 and also at 16. The counterbore 16 forms a valve seat 17 for the ball valve or closure 18 which is yieldingly held in its closed position by the compression spring 19, one end of which abuts against the wall, and the other end of which rests against the inner face of the washer 20.

The washer 20 is clamped between one end of the cylinder 12 and one end of the coupling sleeve 21 which is secured to the outer end of the cylinder 12 by the screw threaded connection 22. The inner end of the bore 23 of the sleeve 22 is enlarged in diameter to form a shoulder 24 which limits the outward movement of the cup leather 25. A washer 26 is positioned in the bottom of the cup leather 25, and a compression spring 27 confined between the washers 20 and 26 tends to yieldingly hold the cup leather 25 in its outermost position. As shown in the drawing, the cup leather and the washer 26 are provided with aligned openings to permit the passage of lubricant therethrough.

The outer end of the sleeve 21 is provided with a pair of oppositely disposed bayonet slots 28 (only one of which is shown). These slots are adapted to receive the ends 7 of the pin of the fitting and to mechanically connect the coupling sleeve 21 with the fitting 5. When the bayonet slots 28 are completely engaged with the ends 7 of the pin in the fitting, the end 29 of the fitting is in contact with the outer face of the cup leather 25 which is held against the end of the fitting under the tension of the spring 27.

A plunger rod 30 is reciprocably mounted in the cap 9, and its inner end is adapted to enter the bore 14 of the cylinder 12. The counterbore 15 insures the registry of the inner end of the plunger rod 30 with the bore 14. Suitably formed stops 31 prevent the plunger rod 30 from being completely withdrawn through the cap 9.

Slidably mounted upon the plunger rod is a piston P which comprises the face plate 32, the follower plate 33, and the felt disc 34 which is clamped between the face plate and the follower plate. Post rivets 35 may be used for securing the three elements forming the plunger together. A pin 36, or any other suitable means, projecting from the side of the plunger rod 30, may be used for limiting the inward movement of the plunger into the cylinder 14.

In operation after the barrel 8 of my improved compressor has been filled with lubricant and the cap replaced, the operator brings the compressor into position so that the coupling sleeve 21 may be engaged over the outer end of the fitting 5 and by rotating the barrel of the gun causes the bayonet slots 28 to receive the ends 7 of the pin of the fitting. When this motion is completed, a sealed connection between the fitting and the coupling sleeve 21 has been effected. The operator thereupon pushes inwardly upon the handle 37 secured to the outer end of the plunger rod 30. This causes the inner end of the plunger rod 30 to enter the cylinder 14 and displace the contents therefrom past the check valve 18. As the operator withdraws the plunger rod from the cylinder 14, the check valve 18 closes and further retractive movement of the plunger rod causes a vacuum, or at least a partial vacuum, to be caused in the cylinder 14, so that when the inner end of the plunger clears the end of the cylinder 14, that is, when it reaches the position shown in Figure 1, the vacuum in the cylinder 14 will be transmitted to the lubricant and atmospheric pressure being exerted upon the outer face of the plunger P will cause the latter to move inwardly or toward the cylinder 14 and thereby force lubricant from the barrel 8 into the latter. In this manner the cylinder 14 is primed or filled so that when the plunger rod is again moved inwardly, it will displace the lubricant from the cylinder 14.

The operator can continue to reciprocate the plunger rod 30 until the desired quantity of lubricant has been forced into the fitting and the bearing.

The cross-sectional area of the cylinder 14 and the piston rod may be made as small as desired, so that it will be possible to exert comparatively high pressures upon the lubricant without undue exertion on the part of the operator. It will also be noted that in my improved construction the high pressure cylinder 14 is primed or charged with lubricant from the barrel 8 as a result of the movement of the plunger rod which ejects the lubricant from the cylinder 14. This is a very convenient arrangement in that the operator need perform but one kind of operation to assure a supply of lubricant to a fitting.

The embodiment of my invention illustrated in Figure 2 is similar to that shown in Figure 1, except that different means are provided for effecting the sealed connection between the compressor and the fitting. In this form of my invention the fitting is cylindrical in contour and has no projecting pin ends similar to the element 7 of the construction shown in Figure 1. The coupling sleeve 21' has a transversely extending wall 26' which serves as an abutment for the spring 19' that holds the closure 18' in its closed position. The outer side of this wall 26' has a spherically shaped projection 38 which is adapted to project into the opening in the end of the fitting 5', and by its contact with the edge of this opening form a sealed connection with the fitting. The area of the opening in the fitting 5' should be less than the cross-sectional area of the plunger rod 30', so that the pressure exerted upon this plunger rod will be effective in holding the spherical projection 38 in contact with the fitting.

From the above description it will be apparent that in the modified form of my invention there is no mechanical connection between the fitting and the compressor, except that which results from the pressure exerted upon the lubricant in the cylinder 14'. The diameter of the bore of the outer end of the sleeve 21' is preferably made somewhat larger than the diameter of the outer end of the fitting 5' so as to permit slight angular movement of the compressor relatively to the fitting without breaking off the fitting or otherwise injuring it. The method of operating the modified form of my invention will be clearly understood from the description of the method of operating the embodiment of my invention shown in Figure 1.

While I have described the details of the construction of the preferred embodiment of my invention, it is to be clearly understood that my invention is not limited to these details of construction, but is capable of other adaptations and modifications within the scope of the appended claims.

Having thus described my invention, what I claim is:—

1. A lubricant compressor of the class described comprising a barrel, a cap secured to one end of said barrel, a high pressure cylinder secured to the other end of said barrel, a coupling member for making a quick detachable connection with a lubricant receiving nipple, said member carried by said cylinder, a washer clamped between said cylinder and said coupling member, a valve for said cylinder, sealing means for said coupling, spring means between said washer and said valve for holding said valve in closed position, a spring between said washer and said sealing member, a plunger extending through said barrel and cooperating with said cylinder, and a piston in said barrel and co-axial with said plunger.

2. A lubricant compressor of the class described comprising a lubricant reservoir, a high pressure cylinder carried by said reservoir, a free plunger for said cylinder extending through said reservoir, a piston for said reservoir freely slidable therein and co-axial with said plunger, a handle for said plunger, a coupling carried by said cylinder and adapted to make a quick detachable connection with a lubricant receiving nipple, a spring pressed sealing part for said coupling, a spring pressed check valve for said cylinder, means forming a seat for said check valve, and a single separate means forming a common support for the springs of said valve and said sealing member.

In witness whereof, I hereunto subscribe my name this 15th day of February, 1924.

DOUGLAS F. FESLER.